United States Patent [19]

Weaver

[11] 4,170,158

[45] Oct. 9, 1979

[54] RADIAL ARM SAW CUTTING GAUGE

[76] Inventor: John H. Weaver, 207 Hawkins Dr., Brainerd, Minn. 56401

[21] Appl. No.: 923,932

[22] Filed: Jul. 13, 1978

[51] Int. Cl.$^2$ ............................................. B27B 27/00
[52] U.S. Cl. ................................. 83/522; 83/486.1; 33/483
[58] Field of Search .................. 83/522, 486.1, 471.2, 83/471.3; 33/107, 174 R

[56] References Cited

U.S. PATENT DOCUMENTS

| | | | |
|---|---|---|---|
| 2,075,282 | 3/1937 | Hedgpeth | 83/438 |
| 2,485,274 | 10/1949 | Garrett | 83/468 |
| 2,659,980 | 11/1953 | Dunn | 33/174 G |
| 2,766,784 | 10/1956 | Antczak | 83/437 |
| 2,818,093 | 12/1957 | Thornburg | 83/471.2 |
| 2,852,049 | 9/1958 | Peterson | 83/467 R |
| 3,059,674 | 10/1962 | Boling | 83/468 |
| 3,066,710 | 12/1962 | Silken | 83/522 |
| 3,348,591 | 10/1967 | Carrasco | 83/467 R |
| 3,896,554 | 7/1975 | Pacion | 33/107 R |
| 4,024,831 | 5/1977 | Sperling | 33/107 R |

*Primary Examiner*—Donald R. Schran
*Attorney, Agent, or Firm*—Merchant, Gould, Smith, Edell, Welter & Schmidt

[57] ABSTRACT

An elongated gauge bar bent along its longitudinal center to form a pair of longitudinally extending flanges at right angles to each other and each having inner and outer surfaces and an outer longitudinal edge. Each outer surface is provided with transverse dimension indicating lines calibrated in an arithmetical system differing from that of the lines of the other surface. The gauge bar is used on the guide bar of a radial saw to accurately indicate a dimension at which a workpiece is to be cut by the saw blade.

5 Claims, 4 Drawing Figures

RADIAL ARM SAW CUTTING GAUGE

BACKGROUND OF THE INVENTION

This invention relates generally to measuring devices and more particularly to such devices which may be used in connection with a radial saw for accurately gauging the length of a workpiece portion to be cut from a length of stock by a saw blade.

Rip fences and like gauging devices are well known on power operated saws. Such devices usually include scales indicating the distance between a rip fence and the saw blade. However, in such arrangements, accuracy is not always achieved, due in many instances to the fact that different saw blades cut kerfs of different widths in a workpiece, and a rip fence setting scale is not accurate when blades of different tooth kerf cutting widths are used. The device of this invention differs from rip fences and stop gauges heretofore provided in that, in use, the device of this invention utilizes one side of the saw blade, at its laterally outermost part, as a point from which measuring or gauging is initiated.

SUMMARY OF THE INVENTION

The gauging device of this invention involves an elongated gauge bar bent along a longitudinal center to provide a pair of flanges disposed at right angles to each other, the flanges having inner surfaces for sliding engagement with the guide bar of a power saw table, and outer surfaces each having a plurality of longitudinally spaced dimension indicating transverse lines thereon. Said dimension indicating lines of one of the outer surfaces is calibrated in an arithmetical system differing from that of the lines of the other of said outer surfaces. The gauge bar has opposite ends arranged to selectively engage the laterally outermost limits of the teeth of a saw blade at one side thereof when said gauge bar is slidably mounted on said guide bar.

DETAILED DESCRIPTION OF THE PREFERRED EMBODIMENT

Figures 1, 2, 3, 4:
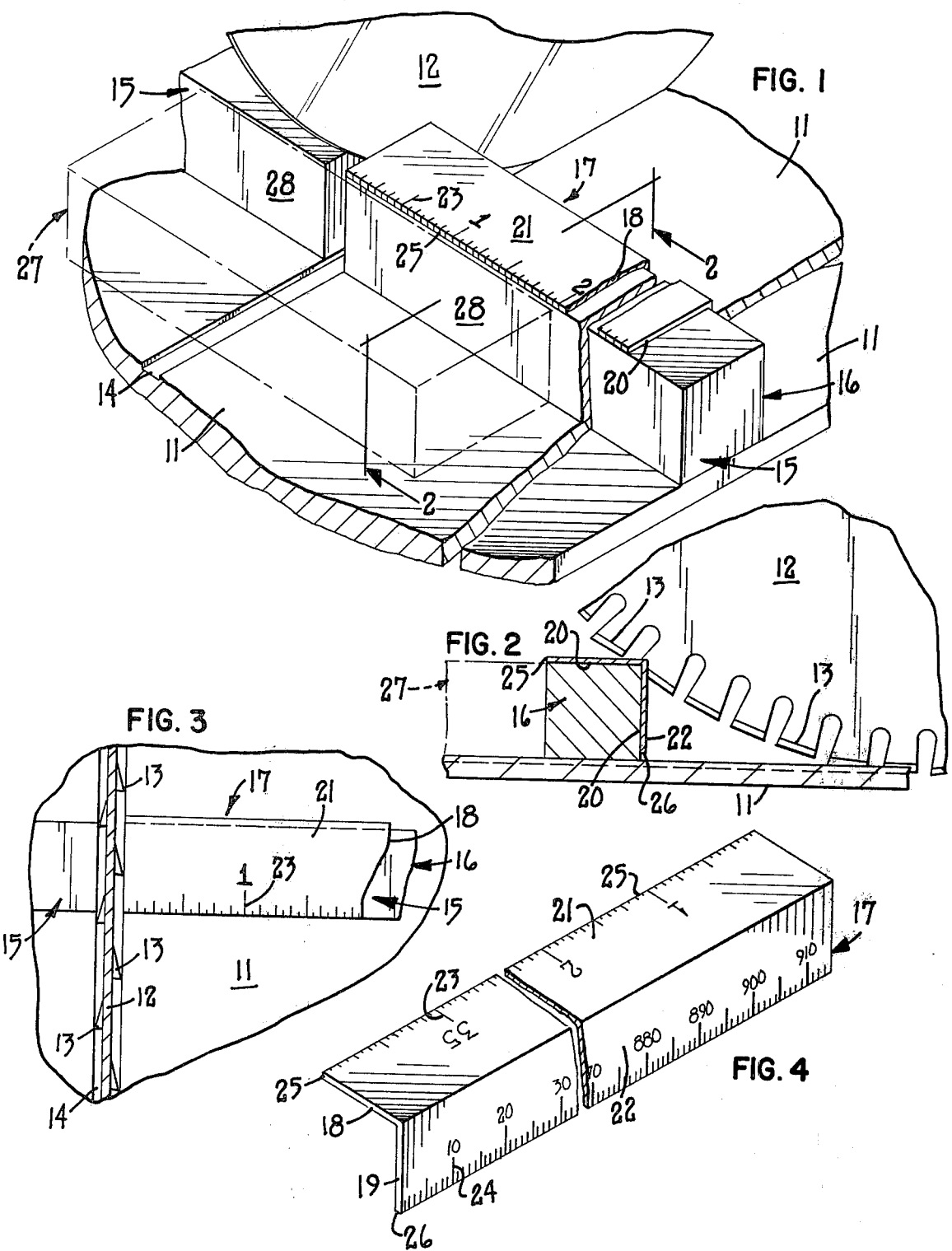
FIG. 1 is a fragmentary view in perspective of a conventional radial arm saw with the gauging device of this invention applied thereto, a saw blade being shown diagrammatically.
FIG. 2 is a fragmentary transverse section taken on the line 2—2 of FIG. 1.
FIG. 3 is a fragmentary view partly in top plane and partly in section of the radial saw table and a portion of a saw blade.
FIG. 4 is a fragmentary view in perspective of the gauging device of this invention.

In FIGS. 1-3, a conventional radial saw, sometimes referred to as a radial arm saw, is shown as including a horizontal table top 11 over which is mounted a circular saw blade 12, the blade 12 being shown in FIGS. 2 and 3 as having cutting teeth 13. The saw blade 12 is rotated by a conventional motor, not shown, and may be assumed to be bodily movable transversely of the table top 11 in overlying relationship thereto. As shown, the radially outer ends of the teeth 13 move within a groove 14, the radially outer portion of the saw blade 12 moving between aligned sections 15 of a guide bar 16 that extends transversely of the direction of bodily movement of the saw blade 12, or in a direction parallel to the rotational axis of the saw blade 12.

The structure above described is well known, and in and of itself does not constitute the instant invention. Hence, in the interest of brevity, further detailed showing and description thereof is omitted.

The gauging device of this invention comprises an elongated gauge bar 17 that is bent along its longitudinal center to provide a pair of longitudinally extending flanges 18 and 19 having inner surfaces 20 and respective outer surfaces 21 and 22. As shown in FIG. 4, the outer surface 21 has marked thereon a plurality of longitudinally spaced transversely extending dimension indicating lines 23 that are calibrated in an arithmetical system of inches and fractions thereof. The outer surface 22 is likewise provided with longitudinally spaced transversely extending dimension indicating lines 24 that are calibrated in the arithmetical system commonly known as the metric system, measuring the length of the surface 22 in millimeters. It will be further noted that the inch system of the surface 21 begins at one end of the gauge bar 17, whereas the millimeter scale begins at the opposite end of the gauge bar 17, for a purpose which will hereinafter become apparent. With reference to FIG. 1, it will be seen that the dimension indicating lines 23 of the inch scale extend over the adjacent longitudinal edge surface 25 of the flange 18. Although not shown, it may be assumed that the dimension indicating lines 24 of the metric scale also extend over the adjacent longitudinal edge surface 26 of the flange 19.

When it is desired to saw a length of stock, shown by broken lines in FIGS. 1 and 2, and indicated generally at 27, to obtain a piece therefrom of a given length or width, the gauge bar 17 is placed upon the guide bar 16 with one of the flanges 18 or 19 thereof resting on the top surface of the guide bar 16, preferably to the right-hand side of the groove 14. Assuming that measurement is being done in the inch scale, the gauge bar 17 is disposed so that the flange 18 overlies the guide bar 16 with the inner surface 20 of the flange 18 engaging the top surface of the guide bar 16, with the inner surface 20 of the flange 19 engaging the rear surface of the guide bar 16. With the driving mechanism for the saw blade 12 de-energized, the blade 12 is bodily moved so that one or more of the teeth 13 thereof are disposed in the gap between the guide bar sections 15, and the gauge bar 17 is slidably moved along the underlying guide bar section 15 until one end of the gauge bar 17 abuttingly engages the laterally outermost limits of the teeth 13 at one side of the saw blade 12, as shown in FIG. 3. The saw blade 12 is then bodily moved rearwardly away from the guide bar 16, and the workpiece 27 is moved into engagement with the front surface, indicated at 28, of the guide bar 16, and moved therealong until one end or side of the workpiece 27 is aligned with a given one of the dimension indicating lines 23. The gauge bar 17 is then moved on the guide bar 16 away from the path of travel of the saw blade 12. While the workpiece or stock 27 is manually held against the guide bar 16, the saw 12 is caused to rotate, and moved bodily forwardly through the stock 27 to cut a workpiece therefrom of highly accurate dimension.

In using the gauging device of this invention when it is desired to work in the metric system, it is only necessary to turn the gauge bar 17 end for end from its position shown in FIGS. 1 and 4, and position the same on the guide bar 16 with the flange 19 overlying the top of the guide bar 16 and the flange 18 in engagement with the rear surface of the guide bar 16. When using either arithmetical system, the portions of the dimension indicating lines 23 or 24 on the edge surfaces 25 or 26 aid substantially in accurately positioning a workpiece or piece of stock 27 that may be of less thickness than the height of the guide bar 16. Further, by using the gauge bar 17 as above described, either with the inch scale or metric scale, workpieces of any desired length within the range of the gauge bar can be very accurately cut, no matter what the width of the kerf cut by the saw 12 may be. Thus, the gauge bar can be used with high accuracy with saw blades having various types of cutting teeth and of various thicknesses.

While I have shown and described a preferred form of gauging device, it will be understood that the same is capable of modification without departure from the spirit and scope of the invention, as defined in the claims.

What is claimed is:

1. A gauging device for a power driven saw, said gauging device comprising an elongated gauge bar bent along a longitudinal center to provide a pair of flanges disposed at right angles to each other; said flanges having inner surfaces for sliding engagement with the guide bar of a power saw table, and outer surfaces each having a plurality of longitudinally spaced dimension indicating transverse lines thereon; said dimension indicating lines of one of said outer surfaces being calibrated in an arithmetical system differing from that of the lines of the other of said outer surfaces; said gauge bar having opposite ends arranged to selectively engage the laterally outermost limits of the teeth of a saw blade at one side thereof when said gauge bar is slidably mounted on said guide bar.

2. The gauging device defined in claim 1 in which said gauge bar flanges each have a side edge calibrated in the arithmetical system of the outer surface of its respective flange.

3. The gauging device defined in claim 1 in which some of the dimension indicating lines on one of said outer surfaces are provided with numerals to indicate graduated distances from one end of said flanges, some of the dimension indicating lines on the other of said outer surfaces being provided with numerals to indicate graduated distances from the other end of said flanges.

4. In a power driven radial saw including a workpiece supporting table having a rotary saw blade overlying said table and bodily moving transversely of the table, a workpiece guide bar on said table and extending transversely of the path of said bodily movement of said saw blade, said guide bar having a top surface, a workpiece engaging vertical front surface, and a vertical rear surface; the combination of a gauging device comprising; an elongated gauge bar bent along its longitudinal center to provide a pair of longitudinally extending flanges disposed at right angles to each other; said flanges having inner surfaces for longitudinal sliding engagement with selected ones of said top and rear surfaces of said guide bar, outer surfaces each having a plurality of longitudinally spaced dimension indicating transverse lines thereon, and opposite ends for selective engagement with the laterally outermost limits of the teeth of said saw blade at one side of said blade; said dimension indicating lines of one of said outer surfaces being calibrated in an arithmetical system differing from that of the lines of the other of said outer surfaces.

5. The combination defined in claim 4 in which said gauge bar flanges each have a side edge calibrated in the arithmetical system of its respective flange, the arithmetical systems of one of said flanges being arranged to indicate distances from an end of said gauge bar opposite from that of the arithmetical system of the other of said flanges.

* * * * *